(12) United States Patent
Schwiesow (10) Patent No.: US 11,294,384 B2
(45) Date of Patent: Apr. 5, 2022

(54) VEHICLE NAVIGATION USING POINT CLOUD DECIMATION

(71) Applicant: The Boeing Company, Chicago, IL (US)

(72) Inventor: Michael Brandon Schwiesow, Madison, AL (US)

(73) Assignee: The Boeing Company, Chicago, IL (US)

(*) Notice: Subject to any disclaimer, the term of this patent is extended or adjusted under 35 U.S.C. 154(b) by 310 days.

(21) Appl. No.: 16/429,499

(22) Filed: Jun. 3, 2019

(65) Prior Publication Data

US 2020/0379467 A1 Dec. 3, 2020

(51) Int. Cl.
| G05D 1/02 | (2020.01) |
|---|---|
| G05D 1/00 | (2006.01) |
| G01S 17/89 | (2020.01) |
| G01S 17/931 | (2020.01) |

(52) U.S. Cl.
CPC ............ G05D 1/0214 (2013.01); G01S 17/89 (2013.01); G01S 17/931 (2020.01); G05D 1/0088 (2013.01); G05D 2201/0213 (2013.01)

(58) Field of Classification Search
CPC ............... G05D 1/0214; G05D 1/0088; G05D 2201/02; G05D 1/024; G05D 2201/0213; G01S 17/931; G01S 17/89; G01S 7/4808; G01S 7/4802; G06K 9/0063; G06K 9/00664; G06K 9/00791
See application file for complete search history.

(56) References Cited

U.S. PATENT DOCUMENTS

| 2018/0074203 A1* | 3/2018 | Zermas | G06K 9/00805 |
|---|---|---|---|
| 2018/0096610 A1* | 4/2018 | Ray | G06K 9/6212 |
| 2019/0310378 A1* | 10/2019 | Ho | G01S 17/89 |
| 2020/0026292 A1* | 1/2020 | Douillard | G05D 1/024 |
| 2020/0272816 A1* | 8/2020 | Endres | G06K 9/6209 |

OTHER PUBLICATIONS

Fischler, et al. "Random Sample Consensus: A Paradigm for Model Fitting with Applications to Image Analysis and Automated Cartography," Communications of the ACM Graphics and Image Processing, vol. 24, No. 6, Jun. 1981, 15 pages.

Ioannou, et al. "Difference of Normals as a Multi-Scale Operator in Unorganized Point Clouds," arXiv, accessible at: http://arxiv.org.abs/1209.1759, Sep. 2012, 9 pages.

Pointcloud, "Plane Model segmentation—tutorial", retrieved on May 30, 2019 at: http://pointclouds.org/documentation/tutorials/planar_segmentation.php#planar-segmentation, 6 pages.

* cited by examiner

Primary Examiner — Hunter B Lonsberry
Assistant Examiner — Jimin You
(74) Attorney, Agent, or Firm — Sage Patent Group (57) ABSTRACT

A method for navigation of a vehicle using point cloud decimation includes generating, by a processor circuit, a ground plane point cloud and an object point cloud. Generating the ground plane point cloud and the object point cloud includes performing point cloud decimation of a 3-D point cloud using ground plane segmentation. The further includes navigating, by the processor circuit, the vehicle using at least the object point cloud.

20 Claims, 7 Drawing Sheets

VEHICLE NAVIGATION USING POINT CLOUD DECIMATION

FIELD

The present disclosure relates to vehicle navigation and more particularly to vehicle navigation using point cloud decimation.

BACKGROUND

Autonomous vehicles may use three-dimensional (3-D) scanning devices, such as light detection and ranging (lidar) sensors, for use in navigation. For example, unmanned aerial vehicles or drones may use lidar sensors for navigation at an airport or other environment. Lidar sensors can provide centimeter scale accuracy for depth measurements and a dense, 360° view of the surrounding environment. Lidar sensors are capable of generating point clouds including hundreds of thousands of points per second which results in high computational costs and delays in processing. For navigation of a moving vehicle, the processing times for extracting static and dynamic objects which the vehicle must avoid in the environment can be unacceptable. Accordingly, there is a need for processing points clouds more efficiently that is acceptable for navigation of a moving vehicle.

SUMMARY

In accordance with an embodiment, a method for navigation of a vehicle using point cloud decimation includes generating, by a processor circuit, a ground plane point cloud and an object point cloud. Generating the ground plane point cloud and the object point cloud include performing point cloud decimation of a 3-D point cloud using ground plane segmentation. The method also includes navigating, by the processor circuit, the vehicle using at least the object point cloud.

In accordance with another embodiment, a system for navigation of a vehicle using point cloud decimation includes a processor circuit and a memory associated with the processor circuit. The memory includes computer readable program instructions that, when executed by the processor circuit cause the processor circuit to perform a set of functions including generating a ground plane point cloud and an object point cloud. Generating the ground plane point cloud and the object point cloud include performing point cloud decimation of a 3-D point cloud using ground plane segmentation. The set of functions also include navigating the vehicle using at least the object point cloud.

In accordance with an embodiment and any of the preceding embodiments, wherein performing point cloud decimation using ground plane segmentation includes defining a representation of a ground plane.

In accordance with an embodiment and any of the preceding embodiments, the method and system also include performing a scanning operation using a 3-D scanning sensor to collect an electronic image of an environment associated with the vehicle. The electronic image includes the 3-D point cloud including point cloud data, and further including generating an output to a vehicle control system of an object point cloud defining objects and structures to be avoided during navigation of the vehicle.

In accordance with an embodiment and any of the preceding embodiments, the method and system also include applying a voxel filter to the 3-D point cloud to eliminate redundant point cloud data and to produce a voxelized point cloud. The voxelized point cloud defines a downsampled version of the 3-D point cloud.

In accordance with an embodiment and any of the preceding embodiments, the method and system also include performing angle and range subset selection on the downsampled version of the 3-D point cloud to select a subset of points for producing a representation of a ground plane.

In accordance with an embodiment and any of the preceding embodiments, wherein performing the angle and range subset selection includes projecting the downsampled version of the 3-D point cloud on a two-dimensional plane; overlaying a polar coordinate grid of points on the downsampled point cloud; and selecting the subset of points of the downsampled version of the 3-D point cloud closest to each point of the polar coordinate grid to ensure vertical planar surfaces contribute only a single point to the selected subset of points so that a majority of points in the selected subset of points belong to actual ground.

In accordance with an embodiment and any of the preceding embodiments, wherein producing the representation of the ground plane includes producing an equation representative of the ground plane. The equation defines a curve fit to points of the subset of points that represent the ground plane.

In accordance with an embodiment and any of the preceding embodiments, wherein producing the representation of the ground plane includes running a random sample consensus (RANSAC) algorithm on the selected subset of points to produce an equation representative of the ground plane.

In accordance with an embodiment and any of the preceding embodiments, the method and system also include determining which points in the downsampled version of the 3-D point cloud are located in the ground plane point cloud and which points in the downsampled version of the 3-D point cloud are located in the object point cloud using the representation of the ground plane.

In accordance with an embodiment and any of the preceding embodiments, wherein determining which points in the downsampled version of the 3-D point cloud are located in the ground plane point cloud and which points are located in the object point cloud include determining a height of each point in the downsampled version of the 3-D point cloud relative to the ground plane; including a particular point in the ground plane point cloud in response to the height of the particular point being less than an acceptance threshold; and including the particular point in the object point cloud in response to the height of the particular point being greater than a rejection threshold.

In accordance with an embodiment and any of the preceding embodiments, wherein the particular point is an ambiguous point in response to the height of the particular point not being less than the acceptance threshold and not being greater than the rejection threshold.

In accordance with an embodiment and any of the preceding embodiments, the method and system also include evaluating a group of neighboring points of the ambiguous point for a vertical feature; including the ambiguous point in the ground plane point cloud in response to determining that the group of neighboring points do not include the vertical feature; and including the ambiguous point in the object point cloud in response to determining that the group of neighboring points do include the vertical feature.

In accordance with an embodiment and any of the preceding embodiments, wherein the vehicle is an autonomous vehicle, and the method and system also include generating an output to a vehicle control system of an object point cloud defining objects and structures to be avoided during navigation of the vehicle.

In accordance with an embodiment and any of the preceding embodiments, wherein the vehicle is an aircraft, and the method and system further include generating an output to a vehicle control system of an object point cloud defining objects and structures to be avoided during navigation of the vehicle.

In accordance with an embodiment and any of the preceding embodiments, the method and system also include generating a plurality of object point cloud; and tracking a moving object using the plurality of object point clouds.

In accordance with an embodiment and any of the preceding embodiments, the method and system also include performing local vehicle motion planning using one or more object point clouds.

In accordance with an embodiment and any of the preceding embodiments, the method and system also include performing global route planning using one or more object point clouds.

The features, functions, and advantages that have been discussed can be achieved independently in various embodiments or may be combined in yet other embodiments further details of which can be seen with reference to the following description and drawings.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1A:
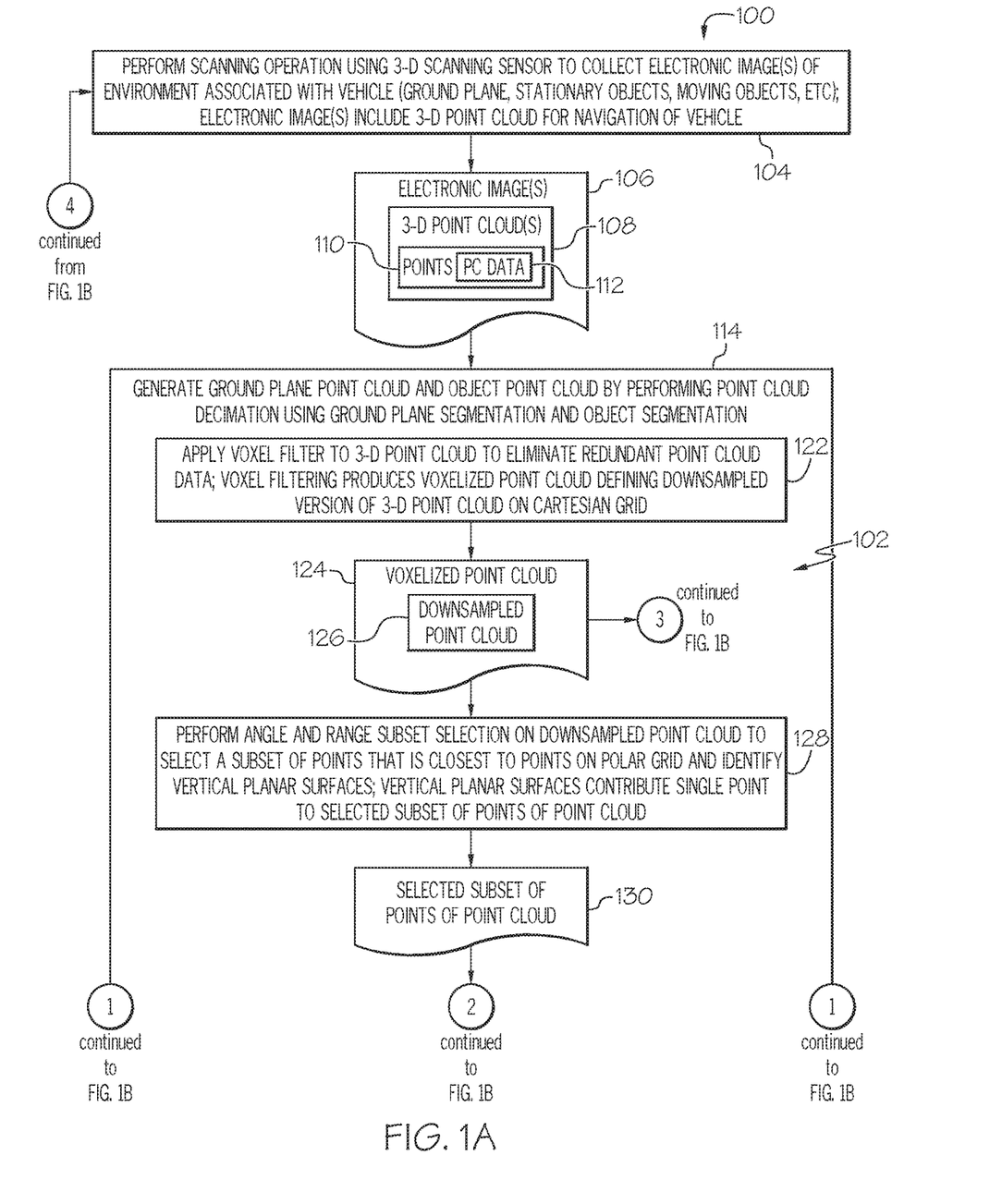
FIGS. 1A-1C are a flow chart of an example of a method for navigation of a vehicle using point cloud decimation accordance with an embodiment of the present disclosure.
Figure 1B:
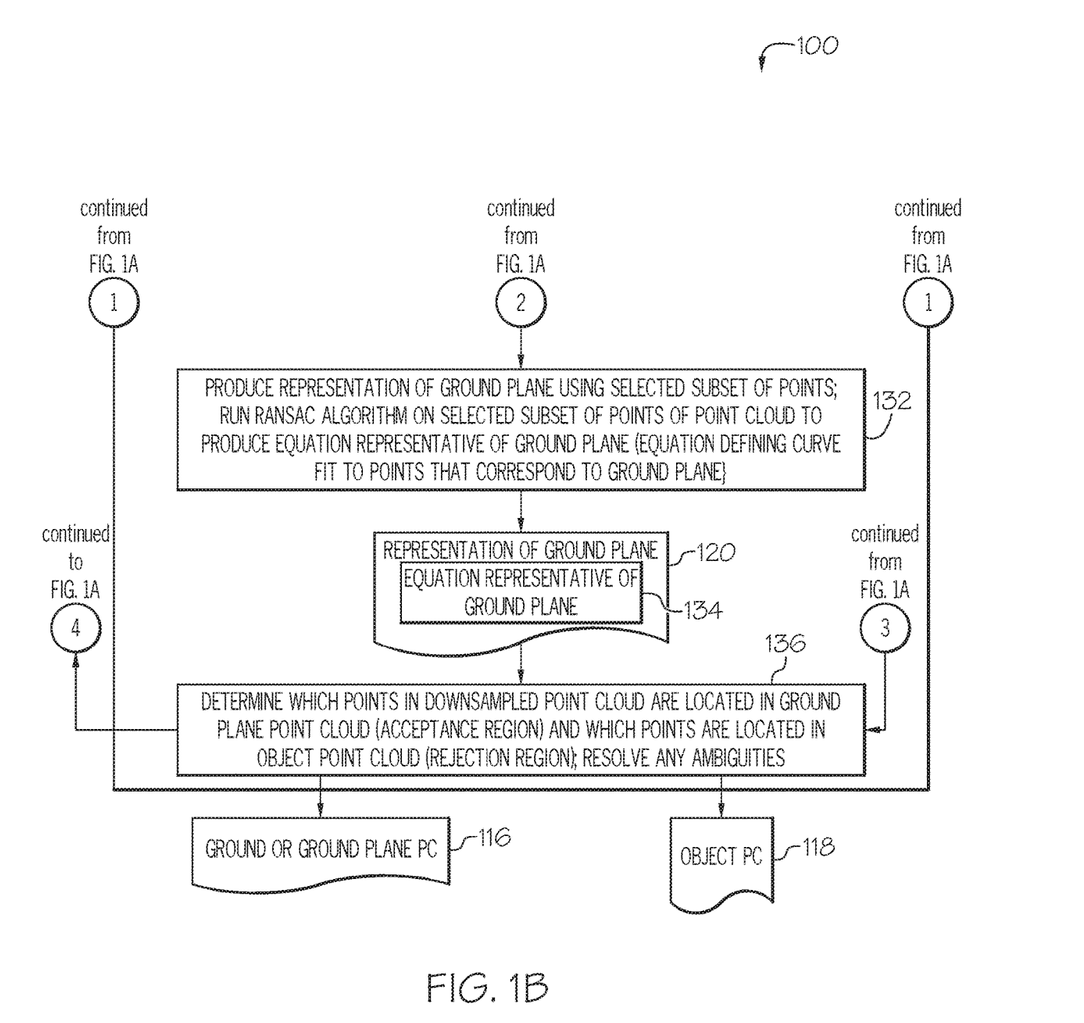
Figure 4:
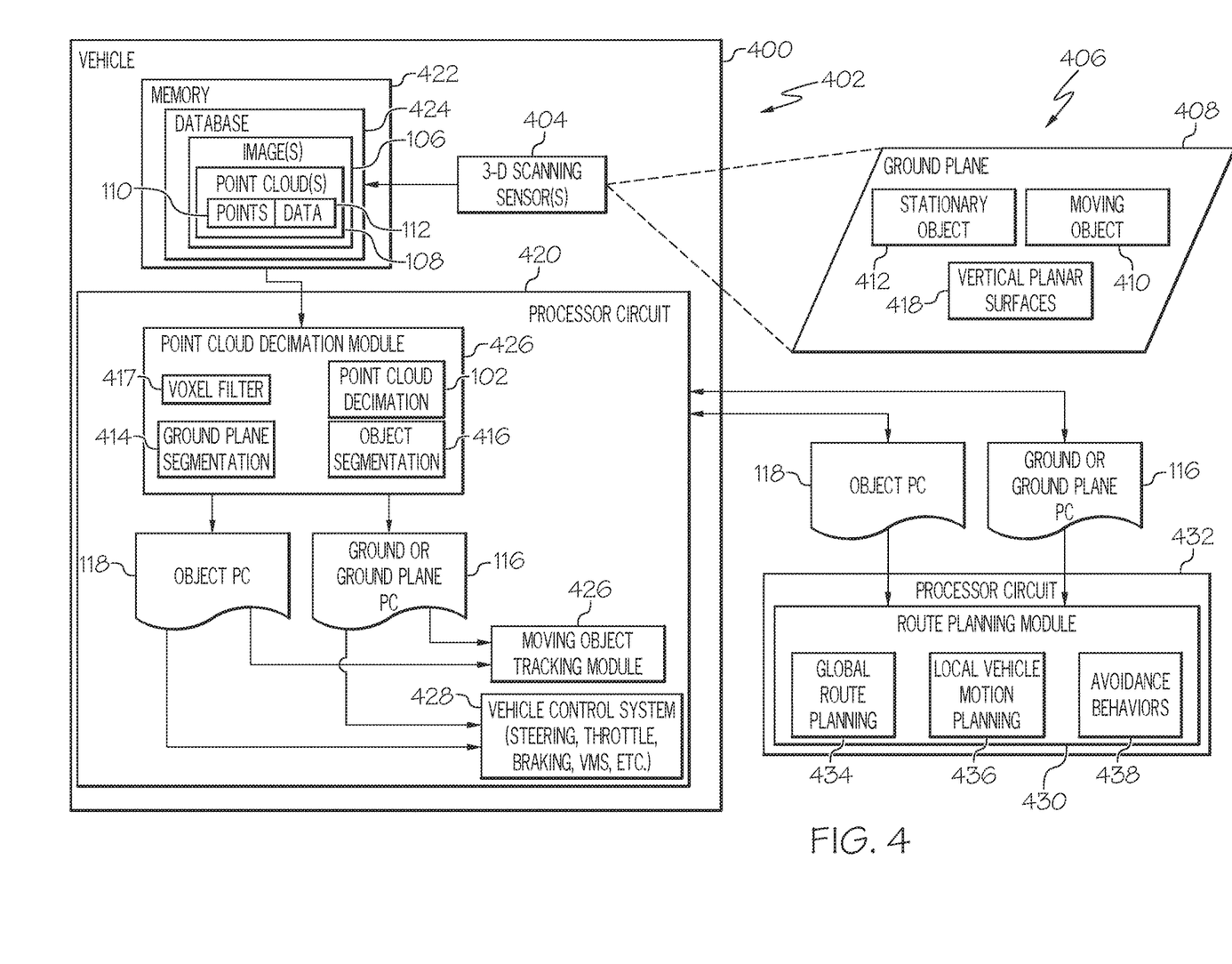
FIG. 4 is a block schematic diagram of an example of a vehicle including a system for navigating the vehicle using point cloud decimation in accordance with an embodiment of the present disclosure.

FIGS. 1A and 1B are a flow chart of an example of a method 100 for navigation of a vehicle using point cloud decimation 102 in accordance with an embodiment of the present disclosure. Referring also to FIG. 4, FIG. 4 is a block schematic diagram of an example of a vehicle 400 including a system 402 for navigating the vehicle 400 using point cloud decimation 102 in accordance with an embodiment of the present disclosure.

In block 104, a scanning operation is performed using one or more 3-D scanning sensors 404 to collect an electronic image or images 106 of an environment 406 associated with the vehicle 400. The environment 406 may include a ground plane 408, one or more moving objects 410 and one or more stationary objects 412. Each electronic image 106 includes a 3-D point cloud 108. Each 3-D point cloud 108 comprises a multiplicity of points 110 and each point 110 includes point cloud data 112. Examples of the point cloud data 112 include at least a 3-D coordinate location of the point 110 in the point cloud 108 relative to some reference, for example, the 3-D scanning sensor 404.

In block 114, a ground plane point cloud 116 and an object point cloud 118 are generated. The ground plane point cloud 116 may also be referred to as ground point cloud or simply ground. Generating the ground plane point cloud 116 and the object point cloud 118 include performing point cloud decimation 102 of the 3-D point cloud 108 using ground plane segmentation 414 (FIG. 4) and object segmentation 416 (FIG. 4). In other words, points 110 in the 3-D point cloud that correspond to the actual ground are separated into the ground plane point cloud 116, and points 110 that correspond to moving objects 410 or stationary objects 412 are separated into one or more object point clouds 118. Point cloud decimation 102 using ground plane segmentation 414 and object segmentation 416 is described in more detail with reference to blocks 122-136. Performing point cloud decimation 102 includes defining a representation 120 of the ground plane 408 (FIG. 4) or actual ground.

In block 122, a voxel filter 417 (FIG. 4) is applied to the 3-D point cloud 108 to eliminate redundant point cloud data 112 and to produce a voxelized point cloud 124. The voxelized point cloud 124 defines a downsampled version of the 3-D point cloud 126. The downsampled version of the 3-D point cloud 126 is also referred to herein as the downsampled point cloud 126.

In block 128, angle and range subset selection is performed on the downsampled point cloud 126 to select a subset of points 130 of the downsampled point cloud 126 for producing the representation 120 of a ground plane 408. An example of performing the angle and range subset selection will be described in more detail with reference to FIG. 1D. The selected subset of points 130 are those points of the downsampled point cloud 126 (voxelized point cloud 124) that are closest to points 208 (FIG. 2) of a polar coordinate grid 202 that is overlaid the downsampled point cloud 126 or voxelized point cloud 124.

In block 132, a representation 120 of the ground plane 408 (FIG. 4) is produced using the selected subset of points 130. In accordance with an embodiment, producing the representation 120 of the ground plane 408 includes producing an equation 134 representative of the ground plane 408. The equation 134 defines a curve fit to points of the selected subset of points 116 that correspond to the ground plane 408 (FIG. 4). The method performs angle and range subset selection to select a subset of points 130 of the downsampled point cloud 126, where a mathematical curve-fitting function may be utilized to define a best-fit equation for the selected subset of points 116 that corresponds to the representation of the ground plane 408. In accordance with an example, producing the representation 120 of the ground plane 408 includes running a random sample consensus (RANSAC) algorithm on the selected subset of points 130 to produce the equation 134 representative of the ground plane 408. An example of RANSAC algorithm is described in "Random Sample Consensus: A Paradigm for Model Fitting with Applications to Image Analysis and Automated Cartography" by Martin A. Fischer and Robert C Bolles, Communications of the ACM Graphics and Image Processing, Volume 24, Number 6, June 1981, the contents of which are incorporated herein by reference.

Figure 3:
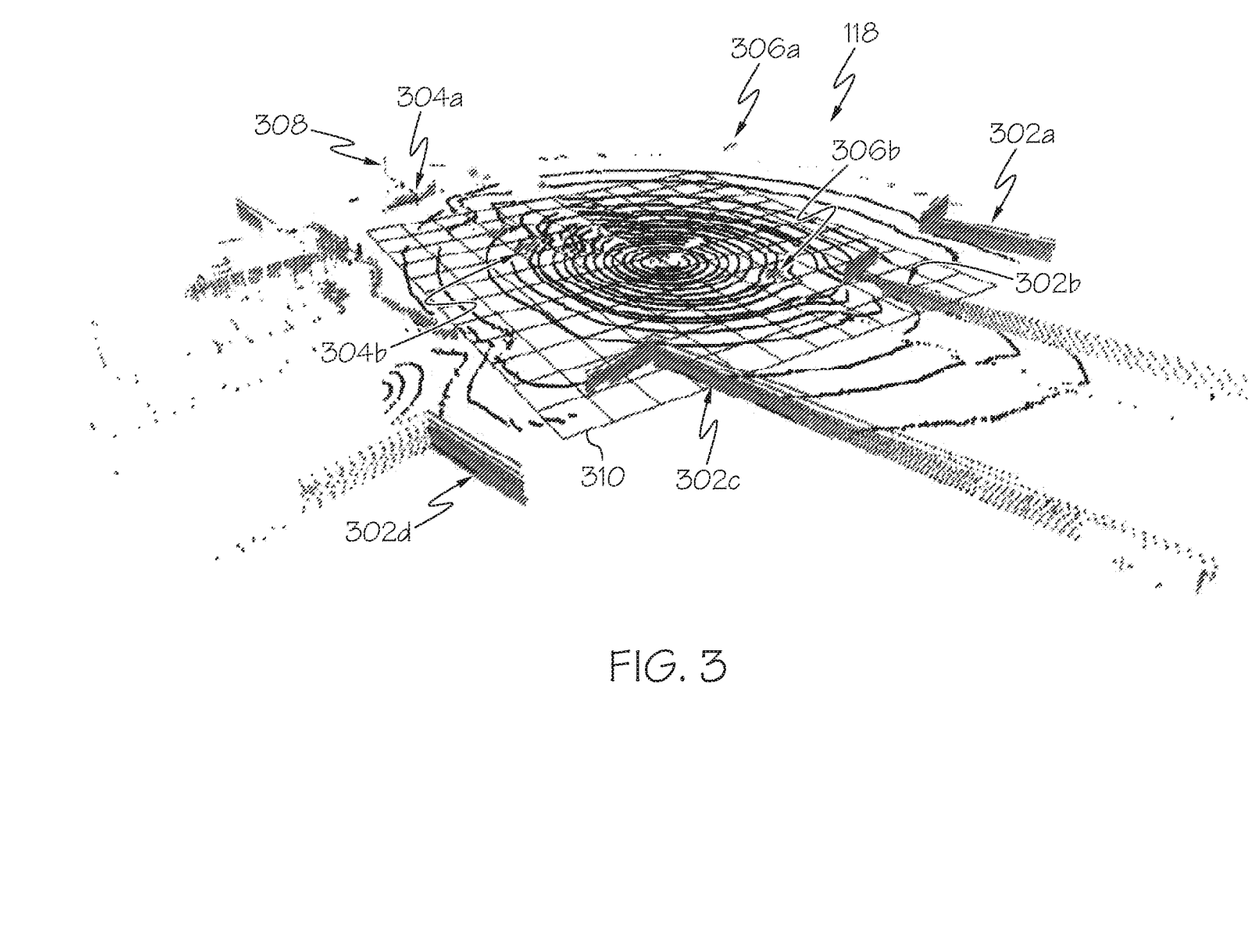
FIG. 3 is an illustration of an example of an object point cloud for use in navigation of a vehicle in accordance with an embodiment of the present disclosure.

In block 136, a determination is made which points in the downsampled point cloud 126 are located in the ground plane point cloud 116 (acceptance region) and which points in the downsampled point cloud 126 are located in the object point cloud 118 (rejection region) using the representation 120 of the ground plane 408 (FIG. 4). An example of determining which points in the downsampled point cloud 126 are located in the ground plane point cloud 116 and which points are located in the object point cloud 118 is described in more detail with reference to FIG. 1E. Any ambiguities between which points of the downsampled point cloud 126 are located in the ground plane point cloud 116 and which points are located in the object point cloud 118 are resolved by the method 156 described with reference to FIG. 1E. Accordingly, point cloud decimation 102 is performed in block 114 which includes blocks 122-136 by segmenting the ground plane point cloud 116 and the object point cloud 118, where performing point cloud decimation to determine which points are segmented to or located in the ground plane point cloud and the object point cloud may comprise defining a representation of a ground plane. FIG. 3 is an illustration of an example of an object point cloud 118 for use in navigation of a vehicle in accordance with an embodiment of the present disclosure. Illustrated in the exemplary object point cloud 118 are structures 302, such as buildings 302a-302d, and objects 304-308, such as moving objects, e.g., aircraft 304a-304b and vehicles 306a-306b, and stationary objects, e.g., light pole 308, where a two-dimensional plane or grid 310 is depicted with respect to the object point cloud 118.

Figure 1C:
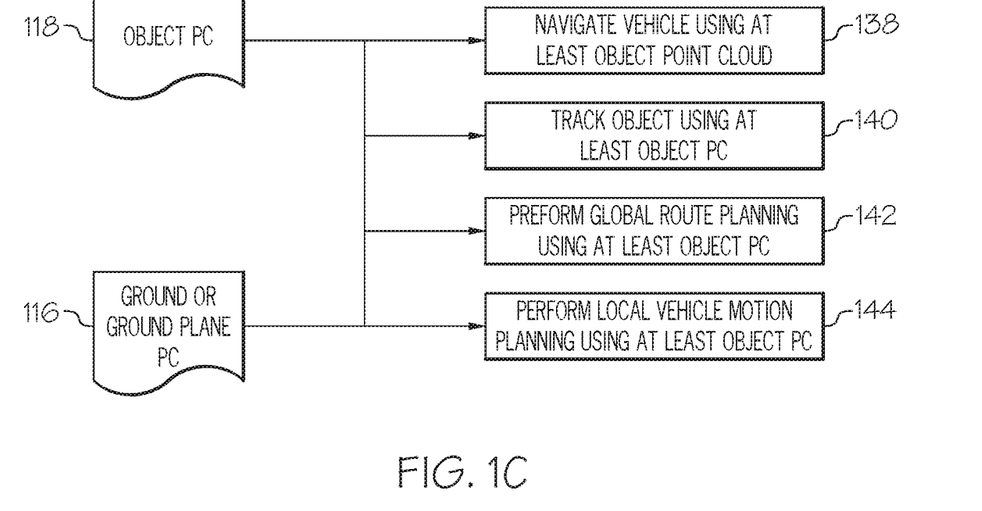

In accordance with the example in FIGS. 1A-1C, the method 100 returns to block 104 and another scanning operation is performed using the one or more 3-D scanning sensors 404 to collect additional electronic images 106 of the environment 406 (FIG. 4) associated with the vehicle, for example, vehicle 400 in FIG. 4. Accordingly, as the vehicle 400 moves or taxies at an airport or other facility, electronic images including 3-D point clouds 108 are continuously collected and processed as described herein to generate a plurality of object point clouds 118 that are used for navigation of the vehicle 400 within the environment 406 associated with the vehicle 400. The method may further include generating an output to a vehicle control system 428 of an object point cloud 118 defining objects 304-308 and structures 302 to be avoided during navigation of the vehicle 400. The object point clouds 118 are also useable for other purposes as described with reference to FIG. 1C.

Referring also to FIG. 1C, in block 138, a vehicle, such as for example the vehicle 400 in FIG. 4, is navigated using at least one or more of the plurality of object point clouds 118 continuously generated by the method 100 in FIG. 1A. In block 140, a moving object, for example moving object 410 in FIG. 4, is continuously tracked using at least the object point clouds 118 that are continuously generated by the method 100. Additionally, stationary objects, such as stationary object 412 in FIG. 4, can be avoided during navigation of the vehicle 400.

In accordance with an embodiment, in block 142, global route planning is performed using at least one or more object point clouds 1118.

In block 144, local vehicle motion planning is performed using at least one or more object point clouds 118 generated by the method 100. Accordingly, movement of a vehicle, such as vehicle 400 in FIG. 4, may be planned prior to movement of the vehicle using at least. one or more object point clouds 118 to avoid any stationary object 412 (FIG. 4). The object point clouds 118 continuously generated by the method 100 during movement of the vehicle are also used to evade any moving objects 410 that may enter a planned route of the vehicle from the local vehicle motion planning in block 144.

Figure 1D:
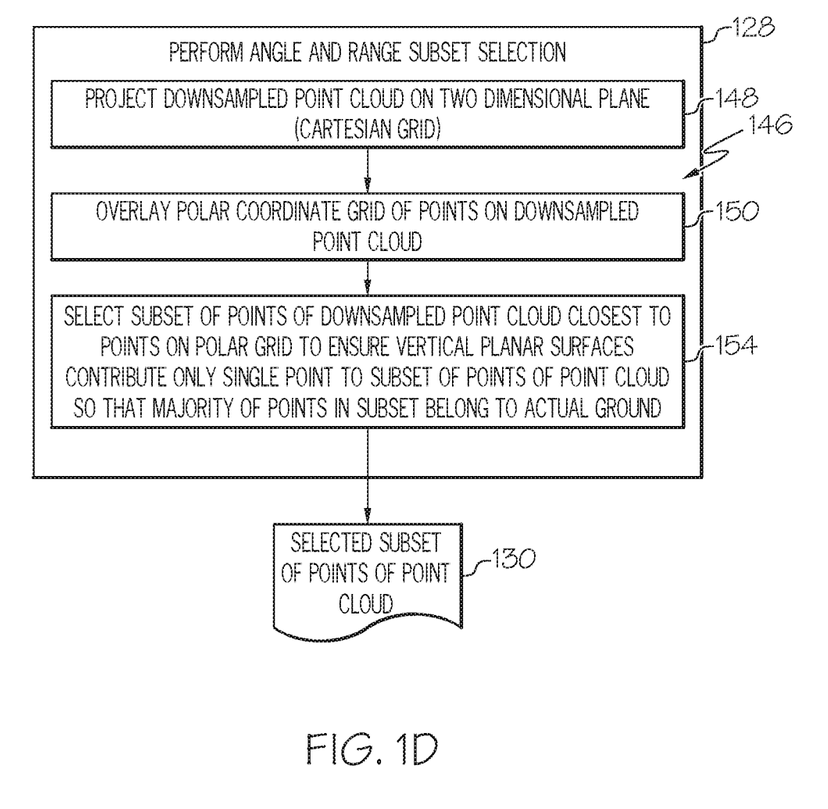
FIG. 1D is a flow chart of an example of a method for performing angle and range subset selection in accordance with an embodiment of the present disclosure.
Figure 2:
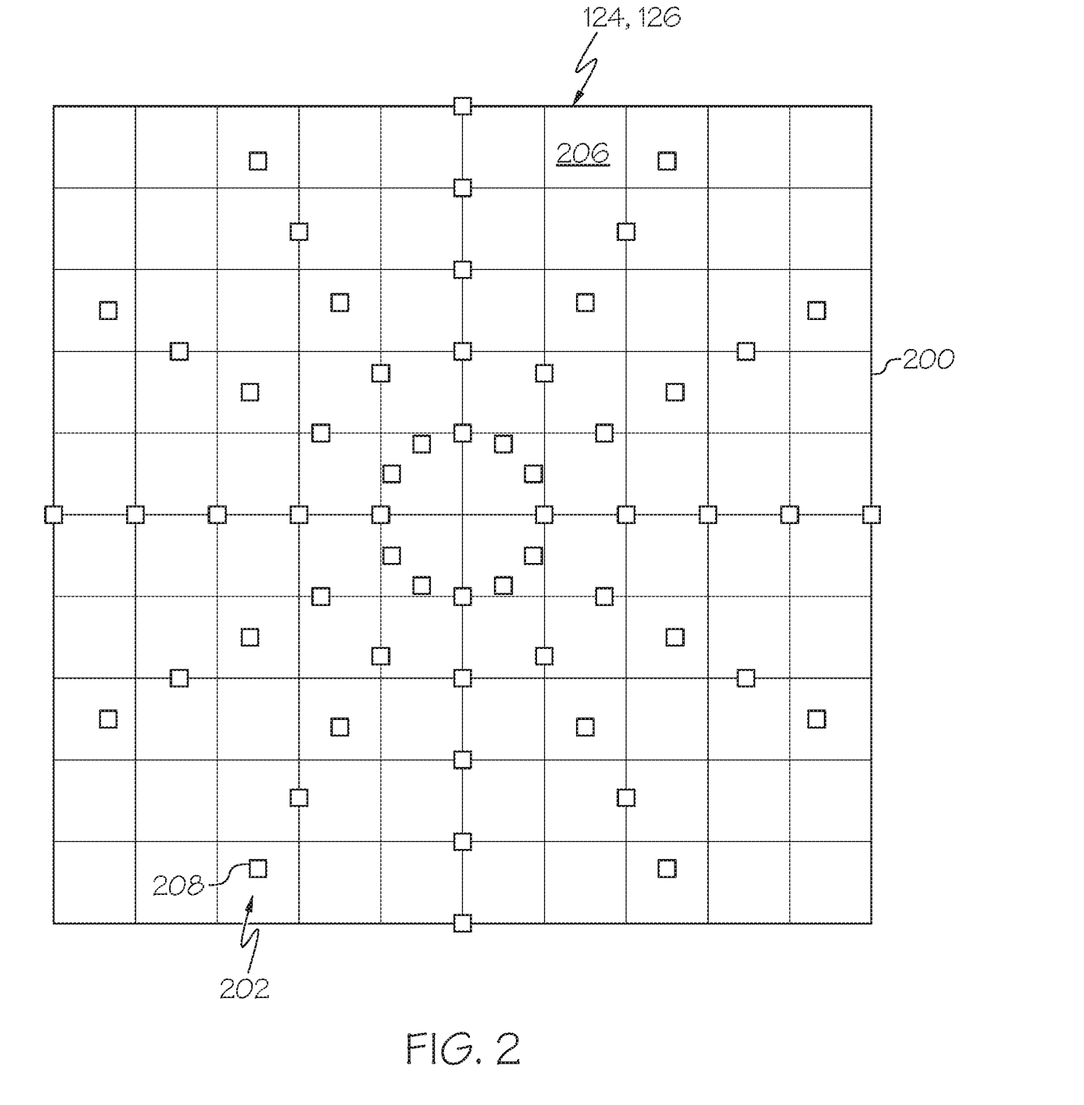
FIG. 2 is an illustration of an example of performing angle and range subset selection on the downsampled version of the 3-D point cloud to select a subset of points for producing a representation of the ground plane in accordance with an embodiment of the present disclosure.

Referring to FIG. 1D, FIG. 1D is a flow chart of an example of a method 146 for performing angle and range subset selection in accordance with an embodiment of the present disclosure. In accordance with an example, the method 146 is used for the block 114 in FIGS. 1A-1B. Referring also to FIG. 2, FIG. 2 is an illustration of an example of performing angle and range subset selection on the downsampled point cloud 126 to select a subset of points 130 (FIG. 1A) for producing a representation 120 (FIG. 1B) of the ground plane 408 (FIG. 4) and ensuring that vertical planar surfaces 418 cannot contribute points to the selected subset of points 130 when determining the equation 134 (FIG. 1B) representative of the ground plane 408 (FIG. 4) in accordance with an embodiment of the present disclosure. Each box in FIG. 2 represents a voxel 206 of the voxelized point cloud 124. As previously described, the voxelized point cloud 124 defines the downsampled point cloud 126. Applying a voxel filter 417 (FIG. 4) in block 122 of FIG. 1A to the 3-D point cloud 108 causes voxelization of the 3-D point cloud 108. Voxelization of the 3-D point cloud 108 means carving a space in a real n-dimensional coordinate system ($\mathbb{R}^n$) into an n-dimensional grid of contiguous hyper-rectangles. The centroid of each of the hyper-rectangle is computed and becomes the location of the voxel 206. FIG. 2 illustrates a two-dimensional representation of the voxelized point cloud 124. In accordance with an example, assuming that each voxel 206 has dimensions of 1 meter by 1 meter and one voxel 206 is defined by corners with coordinates (0,0) and (1,1), if there are three points inside that voxel 206 at coordinates (0.25, 0.75), (0.5, 0.5) and (0.75, 0.25), then the coordinates of that voxel 206 are an average of the coordinates of the three points: ((0.25+0.5+0.75)/3, (0.75, 0.5, 0.25)/3)=(0.5, 0.5).

In block 148, the downsampled point cloud 126 or voxelized point cloud 124 is projected on a two-dimensional plane 200 or cartesian grid as illustrated in FIG. 2.

In block 150, a polar coordinate grid 202 including a plurality of points 208 is overlaid on the downsampled point cloud 126.

In block 154, selection is made from the downsampled point cloud 126 of the particular subset of points 130 that are closest to each point 208 of the polar coordinate grid 202 (where selection may be based on angle and range for a point cloud point relative to the polar coordinate grid points) to ensure vertical planar surfaces 418 (FIG. 4) contribute only a single point to the subset of points 130 so that a majority of points of the selected subset of points 130 belong to actual ground, such as ground plane 408 in FIG. 4. The selected subset of points 130 are then used to produce a representation 120 of the ground plane 408 (FIG. 4) or actual ground in block 132 of FIG. 1B as previously described.

Figure 1E:
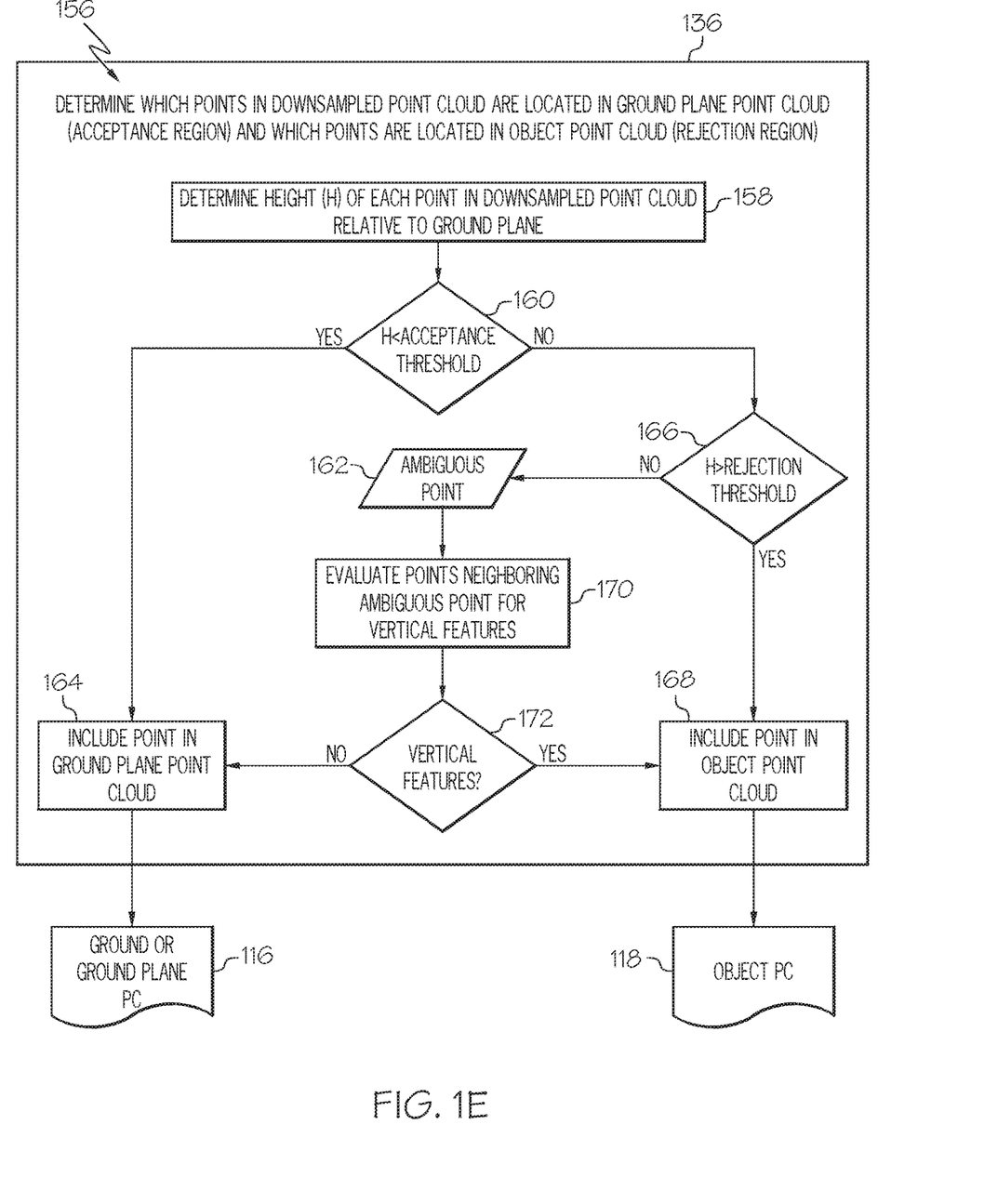
FIG. 1E is a flow chart of an example of a method for determining which points in a downsampled version of a 3-D point cloud are located in a ground point cloud and which points are located in an object point cloud in accordance with an embodiment of the present disclosure.

FIG. 1E is a flow chart of an example of a method 156 for determining which points in a downsampled point cloud 126 are located in a ground point cloud 116 and which points are located in an object point cloud 118 in accordance with an embodiment of the present disclosure. In accordance with an example, the method 156 is used to perform the block 136 in FIG. 1B. The method 156 is performed for each point in the downsampled point cloud 126.

In block 158, a height (H) of each point in the downsampled point cloud 126 relative to the ground plane 408 (FIG. 4) is determined. In block 160, a determination is made if the height (H) of a particular point in the downsampled point cloud 126 is less than an acceptance threshold. In accordance with an example, the acceptance threshold is set at a level so that any points that are an ambiguous point 162 as to whether the point should be in the ground plane point cloud 116 or the object point cloud 118 are evaluated as described further herein so that the ambiguous point 162 is included in the correct point cloud 116 or 118 or most likely correct point cloud 116 or 118.

In block 160, if the height (H) of the particular point is less than the acceptance threshold, the method 156 advances to block 164. In block 164, the particular point of the downsampled point cloud 126 is included in the ground plane point cloud 116 in response to the height (H) of the particular point being less than the acceptance threshold.

If the height (H) of the particular point is not less than the acceptance threshold in block 160, the method 156 advances to block 166. In block 166, a determination is made if the height (H) of the particular point is greater than a rejection threshold. Similar to the acceptance threshold, the rejection threshold is set at a level so that any point that is an ambiguous point 162 as to which point cloud 116 or 118 the point belongs is evaluated as described herein so that the ambiguous point 162 is included in the correct point cloud 116 or 118 or most likely correct point cloud 116 or 118.

In block 166, if the height (H) of the particular point is greater than the rejection threshold, the method 156 advances to block 168. In block 168, the particular point is included in the object point cloud 118 in response to the height (H) of the particular point being greater than the rejection threshold.

If the height (H) of the particular point is not greater than the rejection threshold in block 166, the particular point is an ambiguous point 162. Accordingly, the particular point is an ambiguous point 162 in response to the height (H) of the particular point not being less than the acceptance threshold in block 160 and not being greater than the rejection threshold in block 166.

In block 170, a group of points in the downsampled point cloud 126 (FIG. 1A) neighboring the ambiguous point 162 are evaluated for vertical features. For example, a total vertical variation or height variation with respect to ground of neighboring points of the ambiguous point 162 is computed. Neighboring points are points within a preset radius of the ambiguous point 162. For example, the preset radius may be about 0.5 meters. If the total variation of the group of neighboring points is greater than a predetermined limit, e.g., about 0.1 meters, then a determination is made that the group of neighboring points include vertical features.

In block 172, a determination is made if the group of points neighboring the ambiguous point 162 have a vertical feature or features. The ambiguous point 162 is included in the ground point cloud 116 in block 164 in response to determining that the group of neighboring points do not include the vertical feature or features. The ambiguous point 162 is included in the object point cloud 118 in block 168 in response to determining that the group of neighboring points do include the vertical feature or features.

FIG. 4 is a block schematic diagram of an example of a vehicle 400 including a system 402 for navigating the vehicle 400 using point cloud decimation 102 (FIGS. 1A-1B) in accordance with an embodiment of the present disclosure. Exampled of the vehicle 400 include but are not necessarily limited to an autonomous vehicle, an aircraft, an unmanned aerial vehicle or drone, etc.

As previously described, the system 402 includes one or more 3-D scanning sensors 404. Examples of the 3-D scanning sensor or sensors include but are not limited to 3-D light detection and ranging (lidar) sensors or any other type sensor capable of providing an electronic image or 3-D point cloud as described herein.

The system 402 also includes a processor circuit 420 and a memory 422 associated with the processor circuit 420. In accordance with an example, the memory 422 includes a database 424 for storing the electronic images 106 including the 3-D points clouds 108 and associated points 110 and data 112. The memory 422 also includes computer readable program instructions that, when executed by the processor circuit 420 cause the processor circuit to perform a set of functions, for example, the set of functions described with reference to FIGS. 1A-1D and methods 100, 146 and 156. The computer readable program instructions include a point cloud decimation module 426. In accordance with an embodiment, the methods described with reference to FIGS. 1A-1D are embodied in the point cloud decimation module 426 and are performed by the processor circuit 420 when executed by the processor circuit 420.

Similar to that previously described, the point cloud decimation module 426 performing the methods previously described generates the ground plane point cloud 116 and the object point cloud 118. The system 402 also includes moving object tracking module configured to track any moving objects 410 in the environment 406 associated with the vehicle 400 using at least the object point cloud 118 so that the vehicle 400 can be maneuvered to avoid the moving objects 410 and any stationary objects 412 in the environment 406.

A vehicle control system 428 is configured to control steering, throttle actuation, brake actuation, a vehicle management system (VMS) etc.

In accordance with an example, a route planning module 430 is provided. The route planning module 430 is embodied on a processor circuit 432 that is separate from the vehicle 400. The route planning module 430 is configured to perform as set of functions including but not necessarily limited to global route planning, local vehicle motion planning 436, and avoidance behaviors 438.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for navigation of a vehicle using point cloud decimation, comprising:
   generating, by a processor circuit, a ground plane point cloud and an object point cloud, wherein generating the ground plane point cloud and the object point cloud comprise performing point cloud decimation of a 3-D point cloud using ground plane segmentation;
   performing angle and range subset selection on a downsampled version of the 3-D point cloud to select a subset of points for producing a representation of a ground plane, wherein performing the angle and range subset selection comprises:
      projecting the downsampled version of the 3-D point cloud on a two-dimensional plane;
      overlaying a polar coordinate grid of points on the downsampled version of the 3-D point cloud; and
      selecting the subset of points of the downsampled version of the 3-D point cloud closest to each point of the polar coordinate grid to ensure vertical planar surfaces contribute only a single point to the selected subset of points so that a majority of points in the selected subset of points belong to actual ground; and
   navigating, by the processor circuit, the vehicle using at least the object point cloud.

2. The method of claim 1, wherein performing point cloud decimation using ground plane segmentation comprises defining a representation of the ground plane.

3. The method of claim 1, further comprising performing a scanning operation using a 3-D scanning sensor to collect an electronic image of an environment associated with the vehicle, wherein the electronic image comprises the 3-D point cloud comprising point cloud data.

4. The method of claim 2, further comprising applying a voxel filter to the 3-D point cloud to eliminate redundant point cloud data and to produce a voxelized point cloud, the voxelized point cloud defining the downsampled version of the 3-D point cloud.

5. The method of claim 1, wherein producing the representation of the ground plane comprises producing an equation representative of the ground plane, wherein the equation defines a curve fit to points of the subset of points that represent the ground plane.

6. The method of claim 1, wherein producing the representation of the ground plane comprises running a random sample consensus (RANSAC) algorithm on the selected subset of points to produce an equation representative of the ground plane.

7. The method of claim 1, further comprising determining which points in the downsampled version of the 3-D point cloud are located in the ground plane point cloud and which points in the downsampled version of the 3-D point cloud are located in the object point cloud using the representation of the ground plane.

8. The method of claim 7, wherein determining which points in the downsampled version of the 3-D point cloud are located in the ground plane point cloud and which points are located in the object point cloud comprises:
   determining a height of each point in the downsampled version of the 3-D point cloud relative to the ground plane;
   including a particular point in the ground plane point cloud in response to the height of the particular point being less than an acceptance threshold; and
   including the particular point in the object point cloud in response to the height of the particular point being greater than a rejection threshold.

9. The method of claim 8, wherein the particular point is an ambiguous point in response to the height of the particular point not being less than the acceptance threshold and not being greater than the rejection threshold.

10. The method of claim 9, further comprising:
    evaluating a group of neighboring points of the ambiguous point for a vertical feature;
    including the ambiguous point in the ground plane point cloud in response to determining that the group of neighboring points do not include the vertical feature; and
    including the ambiguous point in the object point cloud in response to determining the group of neighboring points do include the vertical feature.

11. The method of claim 1, wherein the vehicle is an autonomous vehicle, and the method further comprises generating an output to a vehicle control system of an object point cloud defining objects and structures to be avoided during navigation of the vehicle.

12. The method of claim 1, wherein the vehicle is an aircraft, and the method further comprises generating an output to a vehicle control system of an object point cloud defining objects and structures to be avoided during navigation of the vehicle.

13. The method of claim 1, further comprising:
    generating a plurality of object point cloud; and
    tracking a moving object using the plurality of object point clouds.

14. The method of claim 1, further comprising performing local vehicle motion planning using one or more object point clouds.

15. The method of claim 1, further comprising performing global route planning using one or more object point clouds.

16. A system for navigation of a vehicle using point cloud decimation, the system comprising:
    a processor circuit; and
    a memory associated with the processor circuit the memory comprising computer readable program instructions that, when executed by the processor circuit cause the processor circuit to perform a set of functions comprising:
    generating a ground plane point cloud and an object point cloud, wherein generating the ground plane point cloud and the object point cloud comprise performing point cloud decimation of a 3-D point cloud using ground plane segmentation;
    performing angle and range subset selection on a downsampled version of the 3-D point cloud to select a subset of points for producing a representation of a ground plane, wherein performing the angle and range subset selection comprises:
       projecting the downsampled version of the 3-D point cloud on a two-dimensional plane;
       overlaying a polar coordinate grid of points on the downsampled version of the 3-D point cloud; and
       selecting the subset of points of the downsampled version of the 3-D point cloud closest to each point of the polar coordinate grid to ensure vertical planar surfaces contribute only a single point to the selected subset of points so that a majority of points in the selected subset of points belong to actual ground; and navigating the vehicle using at least the object point cloud.

17. The system of claim 16, wherein performing point cloud decimation using ground plane segmentation comprises defining a representation of a ground plane.

18. The system of claim 16, further comprising performing a scanning operation using a 3-D scanning sensor to collect an electronic image of an environment associated with the vehicle, wherein the electronic image comprises the 3-D point cloud comprising point cloud data, and further including generating an output to a vehicle control system of an object point cloud defining objects and structures to be avoided during navigation of the vehicles.

19. The system of claim 16, further comprising determining which points in the downsampled version of the 3-D point cloud are located in the ground plane point cloud and which points in the downsampled version of the 3-D point cloud are located in the object point cloud using the representation of the ground plane.

20. The system of claim 16, wherein determining which points in the downsampled version of the 3-D point cloud are located in the ground plane point cloud and which points are located in the object point cloud comprises:

determining a height of each point in the downsampled version of the 3-D point cloud relative to the ground plane;

including a particular point in the ground plane point cloud in response to the height of the particular point being less than an acceptance threshold; and including the particular point in the object point cloud in response to the height of the particular point being greater than a rejection threshold.

* * * * *